United States Patent Office 2,979,862
Patented Apr. 18, 1961

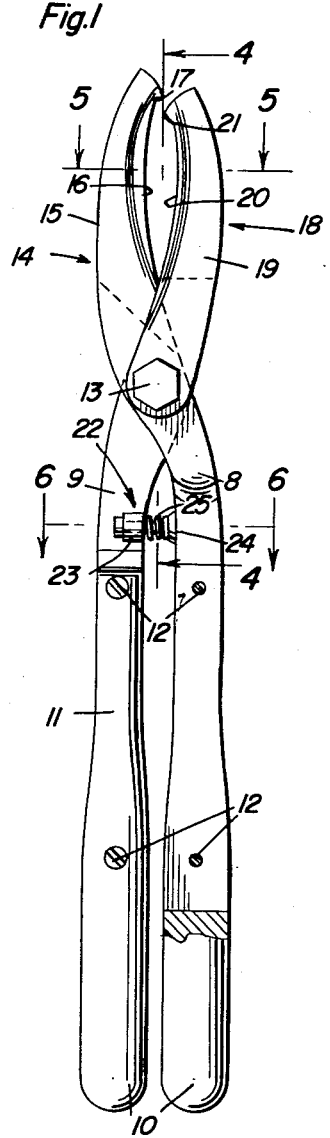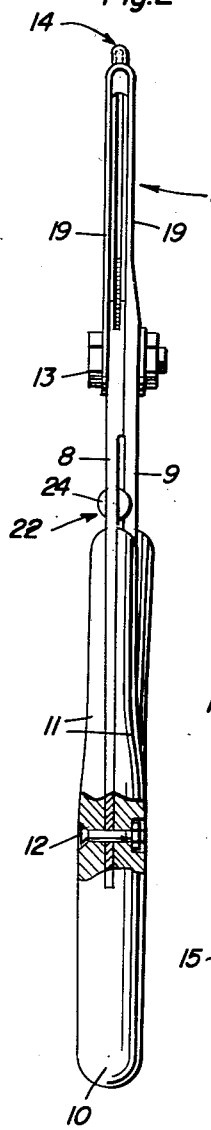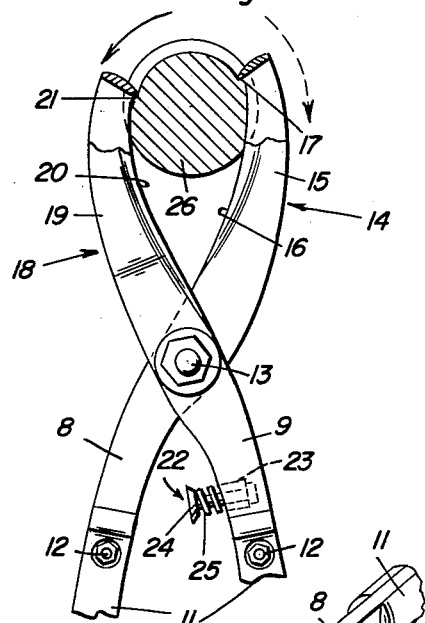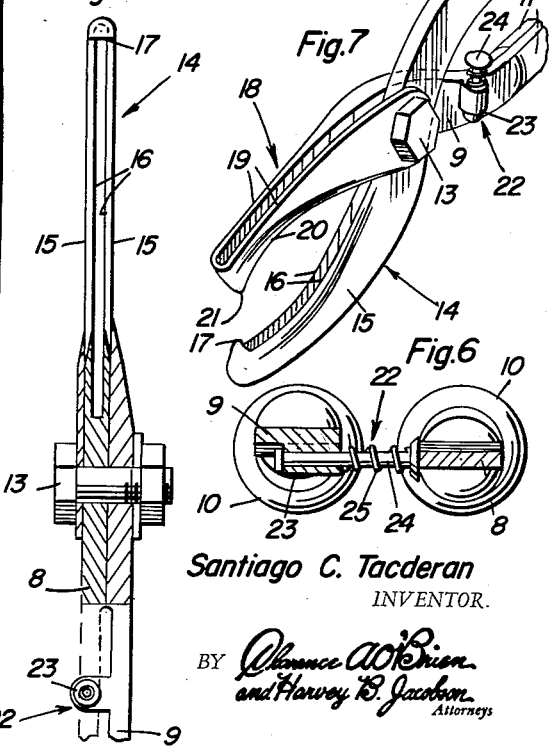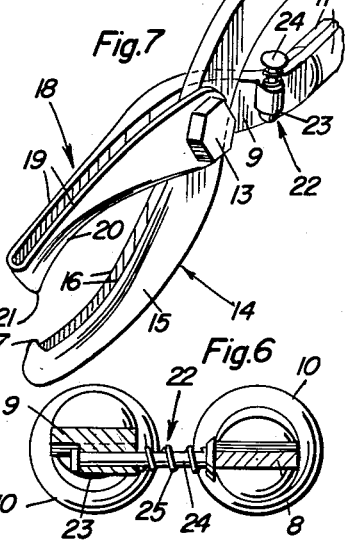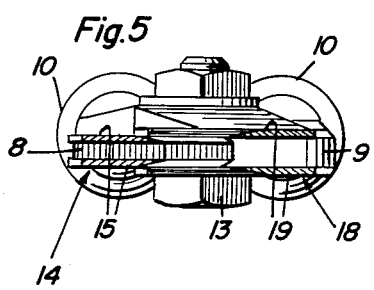
Santiago C. Tacderan
INVENTOR.

2,979,862
GIRDLING TOOL
Santiago C. Tacderan, Rte. 1, Box 122, Earlimart, Calif.
Filed Aug. 19, 1959, Ser. No. 834,735
5 Claims. (Cl. 47—1)

This invention relates to new and useful improvements in girdling tools for use particularly, although not necessarily, by vineyardists, and has for its primary object to provide, in a manner as hereinafter set forth, an implement of this character comprising a novel construction, combination and arrangement of parts whereby a clean, deep and uniform cut may be expeditiously made around the trunk of a grape tree or vine with a minimum of effort.

Another very important object of the present invention is to provide a girdling tool of the aforementioned character comprising a pair of opposed, coacting blades of unique construction for cutting a pair of spaced, circumferential incisions in the vine and then raking or gouging out the material therebetween.

Other objects of the invention are to provide a girdling tool of the character set forth which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a top plan view of a girdling tool constructed in accordance with the present invention showing portions in horizontal section;

Figure 2 is a view in side elevation of the device with a portion thereof broken away in section;

Figure 3 is a bottom plan view of the forward portion of the device, showing the tool in use with portions in horizontal section;

Figure 4 is a longitudinal sectional view on an enlarged scale through the forward portion of the tool, taken substantially on the line 4—4 of Figure 1;

Figure 5 is a view in transverse section on an enlarged scale, taken substantially on the line 5—5 of Figure 1;

Figure 6 is a cross-sectional view on an enlarged scale, taken substantially on the line 6—6 of Figure 1; and Figure 7 is a perspective view of the forward portion of the device, showing the blades in open position.

Referring now to the drawing in detail, it will be seen that the embodiment of the invention which has been illustrated comprises a pair of handles 8 and 9 of suitable metal. Mounted on the handles 8 and 9 are duplicate grips 10 of wood or other suitable material. The grips 10 include bifurcations 11 which receive the handles 8 and 9 therebetween and which are secured thereto by countersunk bolts 12. The forward end portions of the handles 8 and 9 are crossed and pivotally connected by a bolt 13.

Fixed astraddle the pivoted forward end portion of the handle 8 is a longitudinally curved, generally U-shaped knife 14. The pivot bolt 13 passes through openings provided therefor in the legs 15 of the knife 14. The knife legs 15 comprise inner cutting edges 16. The bight portion of the knife 14 is formed to provide a gouging blade 17.

Fixed on the pivoted forward end portion of the handle 9 is a longitudinally curved, generally U-shaped knife 18 which is substantially similar to the knife 14 but somewhat shorter. The legs 19 of the knife 18 straddle the inner portion of the knife 14 and the pivot bolt 13 passes therethrough. One of the legs 19 of the knife 18 is affixed to the inner side of the pivoted end portion of the handle 9. The legs 19 of the knife 18 comprise longitudinal cutting edges 20. The bight portion of the knife 18 is formed to provide a gouging blade or tooth 21.

Mounted on the handle 9 for engagement by the handle 8 is a yieldable stop 22. The stop 22 includes a guide or sleeve 23 which is fixed on the handle 9. Slidable in the guide 23 is a headed plunger 24 which is engageable with the handle 8. A coil spring 25 yieldingly urges the plunger 24 toward the handle 8.

It is thought that the use or operation of the tool will be readily apparent from a consideration of the foregoing. Briefly, as shown in Figure 3 of the drawing, the vine to be girdled, as indicated at 26, is engaged between the generally U-shaped knives 14 and 18. The handles 8 and 9 are then swung toward closed position for causing the knife edges 16 and 20 to cut into the vine while at the same time swinging the tool around the work. The construction and arrangement is such that this may be accomplished while occupying a sitting position on the ground. The above described operation cuts two vertically spaced, circumferentially extending incisions in the vine and the material between said incisions is removed in an obvious manner by the gouging blades 17 and 21 following the cutting edges 16 and 20.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A girdling tool comprising: a pair of handles crossed at one end, an element pivotally connecting the crossed end portions of the handles, a generally U-shaped knife mounted on the pivot element astraddle one of the handles and affixed to the other of said handles and swingable in unison therewith, and a generally U-shaped knife mounted astraddle said one handle and swingable in unison therewith toward the first-named knife, said knives comprising legs including spaced, parallel cutting edges for receiving the work therebetween.

2. A girdling tool in accordance with claim 1, wherein said knives further comprise bight portions including cutting edges connecting the parallel cutting edges at the outer ends thereof.

3. A girdling tool in accordance with claim 2, and means for yieldingly limiting the closing movement of the handles for normally spacing the knives from each other.

4. A girdling tool in accordance with claim 3, wherein said means includes a lateral apertured guide on one of the handles, a plunger slidable through said guide and including a head on one end engageable with the other handle, a coil spring on the plunger engaged under compression with the head for urging the plunger toward said other handle, and a stop on the other end of the plunger engageable with the guide.

5. A girdling tool in accordance with claim 1, said U-shaped knives being oppositely outwardly bowed.

References Cited in the file of this patent
UNITED STATES PATENTS

| | | |
|---|---|---|
| 642,973 | Galbreath | Feb. 6, 1900 |
| 1,456,928 | Lake | May 29, 1923 |
| 1,822,591 | Hickok | Sept. 8, 1931 |
| 2,841,924 | Fink | July 8, 1958 |

FOREIGN PATENTS

| | | |
|---|---|---|
| 101,224 | Australia | June 1, 1937 |
| 61,673 | Sweden | Oct. 12, 1926 |